(12) United States Patent
Bodell

(10) Patent No.: US 6,324,391 B1
(45) Date of Patent: Nov. 27, 2001

(54) METHOD AND SYSTEM FOR CELLULAR COMMUNICATION WITH CENTRALIZED CONTROL AND SIGNAL PROCESSING

(75) Inventor: Donald H. Bodell, Trumbull, CT (US)

(73) Assignee: MVS Incorporated, Trumbull, CT (US)

( * ) Notice: Subject to any disclaimer, the term of this patent is extended or adjusted under 35 U.S.C. 154(b) by 0 days.

(21) Appl. No.: 09/340,358

(22) Filed: Jun. 28, 1999

Related U.S. Application Data

(63) Continuation of application No. 08/729,005, filed on Oct. 10, 1996, now Pat. No. 6,016,426.

(51) Int. Cl.[7] ...................................................... H04Q 7/24
(52) U.S. Cl. ............................ 455/403; 455/422; 455/426
(58) Field of Search ................................... 455/403, 422, 455/426, 555, 560, 561

Primary Examiner—Daniel S. Hunter
Assistant Examiner—Myron K. Wyche
(74) Attorney, Agent, or Firm—L. P. Brooks; Norris, McLaughlin & Marcus

(57) ABSTRACT

A cellular system includes wide band digital signal processing at a central office that is connected to one or more cellular sites by optical fiber cables. Data signals are exchanged between the cell sites and the central office using intensity modulated optical data signals. Control of call supervision and handling is consolidated in the central office to enable dynamic variation of wireless service reception and transmission capabilities at a cell site in response to changing demands for wireless service. Each antenna at a cell site may receive and transmit an assigned RF bandwidth using any frequency within that band. The central office processes the entire received spectrum for controlling detection and transmitting range, RF carrier frequency and transmit power level for an active channel link established between a cellular station and the system in a cell site.

11 Claims, 5 Drawing Sheets

METHOD AND SYSTEM FOR CELLULAR COMMUNICATION WITH CENTRALIZED CONTROL AND SIGNAL PROCESSING

RELATED U.S. APPLICATION DATA

Continuation of Ser. No. 08/729,005, Oct. 10, 1996, now U.S. Pat. No. 6,016,426.

FIELD OF THE INVENTION

The invention relates to so-called cellular communication systems in which "cells" which are located in various geographical areas and which, respectively, receive data from, and transmit data to, mobile or fixed transmitters and receivers which receive from, and transmit to, the cell site radio frequency energy modulated with such data.

BACKGROUND

In the current cellular systems, a "cell" comprises an omnidirectional antenna or directional antennae which each usually covers a sector of the cell, radio frequency receivers and transmitters dedicated in frequency, converters, multiplexers and switching and control equipment to provide first level cell processing, supervision and handoff as well as the supervisory communications to a mobile telephone switching office (MTSO).

Each MTSO contains a substantial amount of equipment and is connected to the cell equipment of the cells within its area of supervision and to a telephone network or Public Switched Telephone Network (PSTN) by land lines, e.g. coaxial cable or conventional telephone lines. Generally speaking, the MTSO includes a switching machine which provides the connection between the trunks or lines from the PSTN and the trunks or lines from the MTSO to the cells and a control system for managing the radio frequency (RF) receiver channels and the RF transmitter channels active at each cell and the interconnection of the trunks from the PSTN and such channels. The MTSO is more complicated than a conventional central telephone office because of the additional level of complexity in call supervision and call routing. This additional level of complexity is required because the network path for individual calls can change several times during a single telephone conversation. Such changes can involve one or any combination of:

a. The radio frequency which the call is using;

b. The sector antenna at a cell site which is handling the call;

c. The cell site which is handling the call; and d. The transmitted radio frequency power for each channel at the cell site and station.

A main drawback of the current systems is that because of the frequency restrictions of the land lines interconnecting the cell equipment with the MTSO equipment, the cell equipment must convert the data modulated radio frequency energy which it receives to a form which can be transmitted by the land lines and it must convert the data which it receives from the MTSO, which is restricted in frequency by the land lines, to data modulated radio frequency energy to be transmitted. As a result, the cell must include not only the radio frequency receiver and transmitters and modulators but also equipment for:

a. Constant monitoring in order to optimize the cell's capacity and the utilization of the spectrum as traffic grows and calling patterns change;

b. Continuous re-deployment and re-arrangement of equipment at the cell sites; and c. Corresponding re-configuration and adjustments to the capacity of the communications links between the cell and the MTSO.

Consequently, the equipment at the cell site is expensive and increases maintenance and deployment of maintenance spare equipment at the site.

The amount of radio frequency and processing equipment at a site defines the site's wireless service capacity and capabilities. The individual radio frequency receivers and transmitters at a site are assigned specific frequencies that define the number of available active channel links at the site. The operating frequencies of the receivers and transmitters are assigned in accordance with specific wireless protocols, which divide the cellular spectrum into blocks of channels to avoid the well known problems of co-channel and adjacent channel interference among cell sites in a cellular system. The switching and processing equipment at each site manage data routing, e.g., pulse width modulated, voice frequency or frequency shift key data, for active channel links established between an antenna and the MTSO, supervise call initiation and call hand-off between antennae and monitor received overhead data, such as, for example, polling data which identifies cellular receivers/transmitters within the detection range of the site.

The MTSO also includes processing equipment for managing active channel links between cell sites and mobile or fixed receiver/transmitters, such as a cellular phone or pager. The equipment further controls and manages routing of overhead and communication data transmitted on active channel links within the entire system.

The fragmentation of call surveillance, monitoring and control functions among the cell sites and the MTSO in a cellular system results in the following disadvantages. First, substantial expense must be incurred for changing cell site capacity and protocol service features for radio frequency equipment in a cell site to permit that different or larger portions of the radio frequency spectrum may be used for establishing active channel links at the cell site. In addition, the high cost of RF equipment imposes practical limitations on the number of RF units which will be included at a cell site. Also, the addition of new RF equipment at a cell site may require expensive re-configuration or re-deployment of land line connections between the cell site and the MTSO to accommodate increased capacity at that specific site. Further, it is very difficult to change active channel link connections from one antenna to another within a cell site or between antennae of different cell sites, or to change the RF transmission power, receiving range or frequency of transmission for an active channel link at a cell site in response to changes in wireless traffic and calling patterns in the geographic coverage area of the cellular system.

Therefore, the current cellular systems have many disadvantages.

BRIEF SUMMARY OF THE INVENTION

The present invention overcomes disadvantages of the prior art systems by employing the apparatus disclosed in my U.S. Pat. No. 4,768,186 to interconnect the equipment at a cell site with the MTSO and by transferring functions of the equipment of a prior art cell site to the MTSO. In this way, the cell site equipment is substantially reduced, with an attendant reduction in cost of the equipment at a cell site by approximately 70%, the total equipment costs of a cellular system is reduced by approximately 45% and the maintenance costs of the system are reduced.

In the preferred embodiment of the invention, the data modulated analog radio frequency signals, e.g. modulated with analog telephone frequency or other communication signals, received by a receiver at a cell site are downconverted to a lower frequency and are used to modulate an optical signal transmitter which is connected to the MTSO by a wide-band optical fiber cable. At the MTSO, the optical signals which are received from the cell site are converted into signals which can be used by a conventional MTSO. In the opposite direction, the data output signals of a conventional MTSO are used to modulate an optical signal transmitter connected to the transmission equipment at the cell site by the wide-band optical fiber cable, and at the cell site, the signals received at the cell site over the optical fiber cable are upconverted to the radio frequency at which the data signals are to be transmitted to the mobile or fixed receiver/transmitter. In this way, much of the equipment formerly necessary at a cell site is eliminated, reducing the cost of, and maintenance at, a cell site, and with the addition of only a relatively small amount of equipment at a MTSO, which supplies signals to and controls the equipment at several cell sites, functions previously performed by equipment at the individual cell sites can be performed at the MTSO.

It will be observed that, within predetermined limits, none of the receivers or transmitters at a cell are limited to the reception or transmission of RF energy at specific frequencies. In other words, each receiver has a wide reception frequency range and each transmitter transmits at a frequency determined at the MTSO. Therefore, the receivers and the transmitters are not limited to specific radio frequencies and communication channels can be selected at the MTSO.

In one aspect of the present invention, a cellular communication system comprises a central switching office, e.g. an MTSO, and a plurality of cell sites, each of which includes RF energy receiving and transmitting antennae and an optical assembly. The central office comprises a digital signal processing assembly that is connected to a "receive" optical signal converter for converting optical signals to electrical signals and an optical signal transmitter for converting electrical signals to optical signals. The optical assemblies at the cell sites include an optical signal transmitter which is connected to the receive optical converter and an optical signal converter for converting optical signals to electrical signals. The optical signal converter converts the optical signals received from the optical signal transmitter of the central office over an optical fiber cable, which can contain one, or a plurality of optical fibers, into electrical signals. Each optical signal transmitter assembly converts electrical signals into intensity modulated optical data signals. Each optical signal converter converts any optical signals into corresponding modulated analog signals.

The digital assembly converts modulated analog signals received from the central office receive converter into digital signals and converts signals received at the central office from the PSTN into modulated analog signals.

Preferably, in each case, the modulated analog signals are converted into corresponding frequency modulated signals which are then applied to the optical signal energy generator of the optical signal transmitter to modulate in intensity the optical energy output of the generator as described in U.S. Pat. No. 4,768,186.

Further features and advantages of the present invention will become readily apparent to those of ordinary skill in the art by reference to the following detailed description and accompanying drawings.

BRIEF DESCRIPTION OF THE DRAWINGS

FIG. 4 is a schematic, simplified diagram of a preferred embodiment of the transmitting apparatus at a cell site; and.

DETAILED DESCRIPTION

Figure 1:
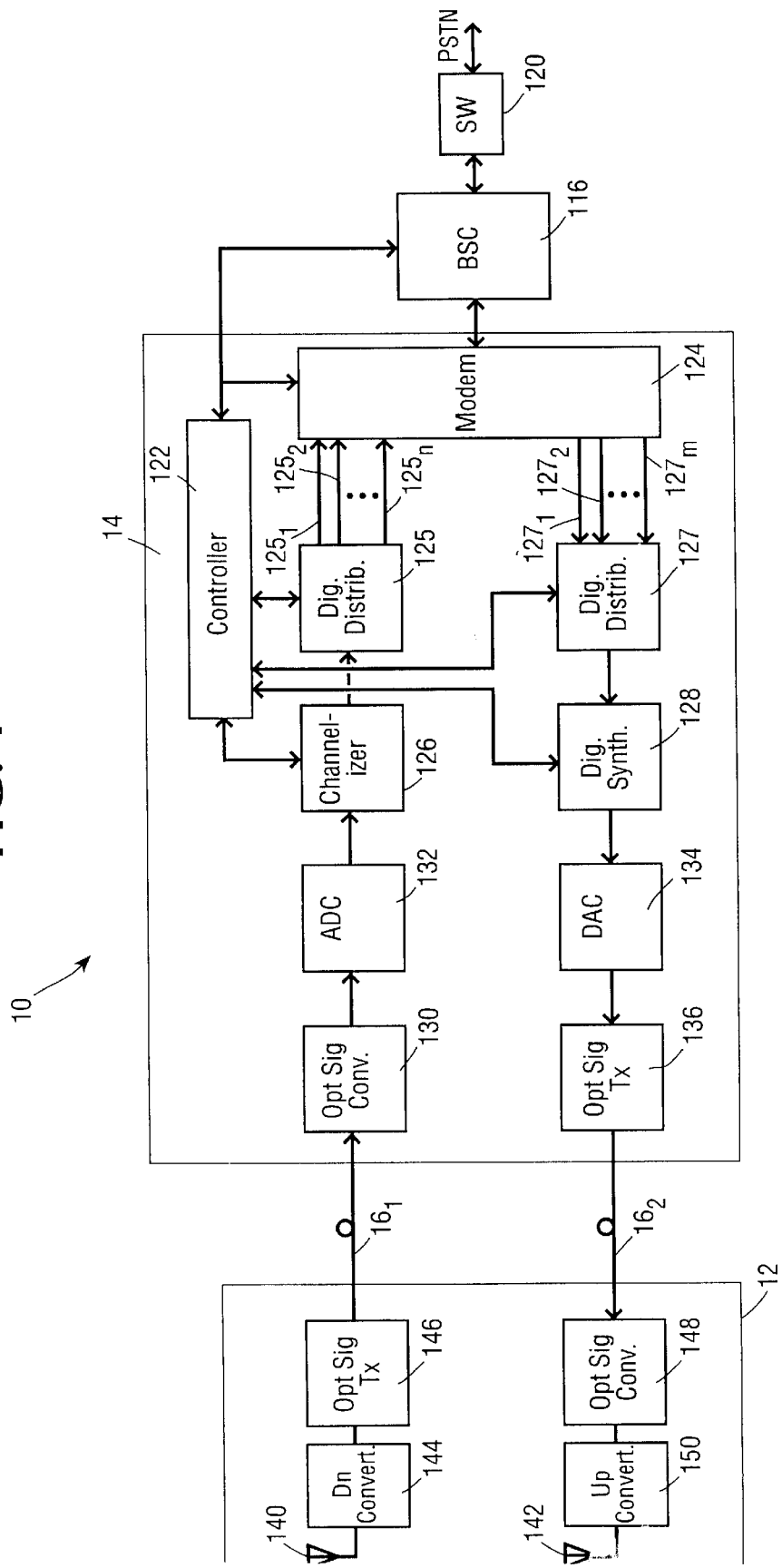
FIG. 1 is a schematic, simplified diagram of the cellular communication system of the invention.

FIG. 1 illustrates a wireless communication system 10 that operates in accordance with the present inventive technique of exchanging telephone frequency or other communication signals between a cellular site and a central office using optical signals transmitted over optical fiber cables for consolidating and centralizing digital signal processing operations at the MTSO, or central office, in the system 10.

Referring to FIG. 1, the system 10 comprises a cell site 12 connected to a central office, or mobile telephone switching office (MTSO), 14 over a wide-band optical fiber cable which includes optical fibers $16_{1,2}$. The central office 14 is suitably connected to a base station controller (BSC) 116. A switch 120 connects the BSC 116 to one or more publicly switched telephone networks (PSTNs) over a suitable communication data line, such as, for example, a T1 line.

Referring again to FIG. 1, the cell site 12 comprises receiving apparatus including a receiving antenna 140, such as an omnidirectional dipole antenna, that is connected to a radio frequency (RF) downconverter 144. An optical signal transmitter assembly 146 connects the downconverter 144 to the optical fiber $16_1$. The cell site 12 further comprises transmission apparatus including a transmission antenna 142 that is connected to an upconverter 150. A transmit optical signal converter 148 connects the upconverter 150 to the fiber $16_2$.

The central office 14 includes a transceiver controller 122 that is connected to a modem 124, a channelizer 126, a digital signal synthesizer 128 and digital distributors 125, 127 over suitable control signal data lines. The channelizer 126 connects an analog-to-digital converter (ADC) 132 to the input of the distributor 125. The distributor 125 includes a plurality of output channels $125_{1,2 \ldots n}$ that are connected to the modem 124. A receive optical signal converter 130 connects the fiber $16_1$ to the ADC 132. The distributor 127 includes a plurality of input channels $127_{1,2 \ldots m}$ that is connected to the modem 124 and a output that is connected to the synthesizer 128. A digital-to-analog converter (DAC) 134 connects the output of the synthesizer 128 to an optical signal transmitter assembly 136. The optical signal transmitter 136 is connected to the fiber $16_2$.

Each of the fibers $16_{1,2}$ suitably includes sufficient bandwidth for supporting at least one channel which may transmit or receive an entire cellular or personal communication system spectrum. The optical cable including the fibers $16_{1,2}$ may be any optical fiber transmission medium which is well known in the art, such as, for example, a standard single mode optical fiber having optimized windows at wavelengths of 1300 nm and 1550 nm.

The downconverter 144 is a conventional radio frequency heterodyne converter that suitably operates to convert analog signals having frequencies in whichever RF band the system 10 is installed for servicing to signals having frequencies between 30 Hz and 11.030 KHz, or IF signals. The upconverter 150 is a conventional radio frequency heterodyne converter that operates to convert IF analog signals to RF signals in the desired RF band.

The optical signal transmitters 136, 146 and the optical signal converters 130, 148 are conventional structures well known in the art, such as, for example, the optical transmitter and optical converter structures, respectively, described in detail in U.S. Pat. No. 4,768,186, incorporated by reference herein.

The ADC 132 and the DAC 134 are well known high speed devices that convert analog signals to a digital representation and vice versa, respectively.

The transceiver controller 122 is a well known microcontroller that is suitably connected to or includes a memory, such as a RAM, not shown. The controller 122 executes instructions stored in the memory for controlling processing functions in the office 14 related to digitally processing data signals modulated on RF signals detected at the receiving antenna 140 and data signals to be used for modulating RF signals transmitted by the transmitting antenna 142 of the cell site 12. As a general matter, the controller 122 exchanges overhead data and establishes and manages active communication channel links with cellular stations that are within the geographically serviceable range of the cell site 12. The serviceable range is defined by a wireless service franchise or the maximum transmission or receiving capabilities of the receiving and transmission equipment at the cell site 12. As explained in greater detail below, the controller 122 may suitably provide control signals to the channelizer 126, the synthesizer 128, the distributors 125, 127 and the modem 124 for implementing the inventive features of instantaneously controlling RF carrier frequency, RF power level, protocol format and the transmitting and receiving antennae used for active channel links established between cellular stations and the system 10.

The channelizer 126 is a programmable digital filter which is well known in the art and suitably includes a microcontroller for executing instructions stored in a memory, such as a RAM. The instructions may include, for example, a Fast Fourier Transform algorithm that provides for segmenting of digital representations of analog signals contained in an IF spectrum into digital representations of the analog signals contained in distinct spectral bands within the IF spectrum, and for generating a Time Division Multiplexed (TDM) data stream of bit packets of the spectrally segmented digital representations of the analog signals. The controller 122 may, in response to changes in wireless service demands on the system 10, suitably provide control signals to the channelizer 126 for adaptively changing the number or the bandwidth of the spectral bands used in segmenting digital representations of analog signals. For example, if the active channel links established at the receiving antenna 140 only involve cellular stations operating in accordance with the TDMA protocol, the controller 122 may automatically program or re-program the channelizer 126 to segment digital representations of analog signals into 200 KHz wide spectral bands. It is to be understood, however, that the controller 122 may program the channelizers 126 to segment analog signals into bands in accordance with any known or proposed wireless protocol.

The modem 124 is a digital device which is well known in the art and includes programmable digital demodulators and modulators for processing a baseband data stream according to the wireless protocol associated with transmission of that baseband data through the air to or from a cellular station. For example, a demodulator or modulator in the modem 124 may be programmed for routing baseband data streams associated with an AMPS protocol through-the-air transmission identically as received. The number of demodulators and modulators typically included in the modem 124 is predetermined according to the expected peak operating demands upon the system 10, in other words, the number of active channels links expected to be established between the system 10 and cellular stations during peak service demand periods.

The distributor 125 is a well known controllable device that may be programmed to select, from a TDM bit stream of digital representations of amplitudes of analog signals, bit packets which correspond to specific spectral bands and route the packets, according to their spectral bands, to the individual output channels $125_{1,2\ldots n}$ at a desired bit rate, preferably slower than the rate that data is received at the input of the distributor 125. In other words, the distributor 125 distributes the digital representations of analog signals onto its output channels according to the spectral position of the digitized analog signals.

The distributor 127 is a well known controllable device that operates in the reverse of the distributor 125. The distributor 127 assigns spectral positions to digital representations of baseband communication channel data streams, which may be supplied over the individual input channels $127_{1,2\ldots m}$, according to the control signals provided by the controller 122. In other words, the controller 122 selects the spectral position for each communication channel signal supplied to the distributor 127. The distributor 127 uses TDM for compressing the data bit streams of the individual communication channel signals which have been assigned spectral positions and generating an output digital bit stream preferably having a higher bit rate than the communication signals supplied thereto.

The synthesizer 128 is a well known programmable digital device that suitably includes a microcontroller for executing instructions stored in a memory, such as a RAM. The instructions may include, for example, a reverse Fast Fourier Transform algorithm that enables the microcontroller in the synthesizer 128 to construct a digital representation of a composite envelope of modulated analog signals. Each digitally represented analog signal represents a signal having a frequency associated with an assigned spectral position and packets of data bits assigned to that spectral position. The packets of data bits represent the amplitude level of the analog signals. The controller 122 may also suitably control the relative levels of amplitude for each of the digital representations of analog signals, which allows for control of the power level of corresponding RF signals at the transmitting antenna of a cell site.

For clarity and to highlight the features the present invention, the operation and structure of the system 10 is described below with reference to transfer of data signals between the central office 14 and the cell site 12. These data signals may, for example, include telephone frequency signals associated with active channel links established from the cell site 12 to cellular stations or other communication data ordinarily exchanged between a central office and cellular stations within the service range of a cell site. It is to be understood, however, that the central office 14 may include additional structures similar, and preferably identical, to the optical signal converter 130, the optical signal transmitter 136, the ADC 132, the DAC 134, the channelizer 125, the synthesizer 128 and the distributors 125, 127 that function to establish and maintain active channel links and exchange other communication data signals with other cell sites similar to the cell site 12 in accordance with the present inventive technique.

The data modulation applied to the analog signals which are received at and processed by the system 10 may include, for example, amplitude modulation (AM), frequency modulation (FM), quadrature amplitude modulation (QAM), phase shift key (PSK) or quadrature phase shift key (QPSK). For purposes of illustration, the system 10 is described below with reference to processing of analog data signals modulated using AM.

In accordance with the present invention, data modulated analog RF signal transmissions, modulated using AM, from cellular stations (not shown) detected at the receiving antenna 140 of the cell site 12 are downconverted to lower frequency signals by the downconverter 144. The antenna 140 detects all AM RF signals having carrier frequencies within a predetermined radio frequency range. The lower frequency signals are used for modulating the optical signal transmitter 146, which supplies an intensity modulated optical receive signal to the office 14. The optical signal converter 130 in the office 14 converts the optical receive signal into AM analog signals which are electrically equivalent, in terms of frequency and amplitude, to those supplied to the optical signal transmitter 146. The ADC 132 converts those AM analog signals into digitally representative form as streams of data bits, which are routed to the channelizer 126.

The controller 122 provides control signals to the channelizer 126 for causing the channelizer 126 to separate and group the digitally represented AM signals into spectral bands having predetermined bandwidths. The frequency ranges of the spectral bands are selected to correspond to the frequencies of analog signals which are representative of the RF signals expected to be received at the antenna 140 for the active channel links established at the cell site 12. The channelizer 126 generates a TDM output bit stream including the spectrally segmented digital representations of the AM signals.

The TDM bit stream is routed to the distributor 125, which places individual spectral segments of digital representations of AM signals on the output channels $125_{1,2 \ldots n}$, to provide that the data bit stream for an output channel is at a suitable rate for processing of the digitized communication data signals at and transmission to the modem 124. The demodulators at the modem 124 are suitably coupled to the output channels $125_{1,2 \ldots n}$ so that demodulators programmed for a selected protocol process data signals having the same protocol format. The demodulators route one or more communication channel data signals, depending on the wireless protocol, as individual channel digital bit streams to the BSC 116. The BSC 116 either routes the channel bit streams to the switch 120 for transfer to a PSTN, or back to the modem 124 for transmission to a cellular station which has established an active link with the system 10.

The controller 122 also samples the bit streams placed on the output channels of the distributor 125 and monitors the digital representations of the amplitudes of the AM signals in order to determine the actual received RF power levels for the active links established at the cell site 12. The RF levels are proportional to the digital representation of the amplitudes of the AM signals provided to the optical signal transmitter 146 and the ADC 132.

In the reverse or transmit direction, the transceiver controller 122 supplies control signals to the BSC 116 and the modem 124 to provide for transfer from the switch 120 to the modulators of the modem 124 of baseband channel data signals indicated for transmission to a cellular station that has established an active link with the cell site 12. For simplicity, it is assumed that all baseband channel data signals provided from the BSC 116 are in digital form and are indicated for transmission from the antenna 142 in the system 10. The controller 122 provides control signals for routing baseband channel data signals to the modulators in the modem 124 programmed to operate in accordance with the wireless protocol for the destination cellular station for the respective baseband channel data signals. The modulators in the modem 124 route the baseband channel data signals to the input channels $127_{1,2 \ldots m}$ of the distributor 127.

Based on control signals provided from the controller 122, the distributor 127 places the data streams for the baseband channel signals into spectral positions associated with the generation of digital representations of AM analog signals having frequencies corresponding to the RF carrier frequencies which are designated for the transmission of communication signals for the respective active channel links. The distributor 127 compresses the spectrally positioned channel data signals using TDM and supplies a compressed, high rate bit stream to the synthesizer 128, where the bit rate is preferably greater than that supplied to the distributor 127.

The controller 122 supplies control signals to the synthesizer 128 to provide for generation of digital representations of analog signals modulated by the spectrally positioned baseband channel data. The control signals provide that the digital representation of the amplitude for an analog signal is proportional to the RF power level to be transmitted at a cell site and that the frequency of an analog signal is related to the RF frequency for transmission for the baseband channel data. The spectral positions provide for correlation of the frequencies of the signals to be generated with the channel data streams used for modulating those signals, respectively. The synthesizer 128 supplies the bit stream including the digital representations of the AM signals to the DAC 134, which converts them back into AM analog signals.

The AM analog signals modulate the optical signal transmitter 136 for generating an intensity modulated optical transmit signal. The optical transmit signal is routed over the fiber $16_2$ to the optical signal converter 148, which converts the optical transmit signal back to electrical form in the same manner as the optical receiver 130. The electrical signal representation of the optical transmit signal is supplied to the upconverter 150, which converts the lower frequency AM signals to corresponding modulated RF carrier signals. These RF signals are transmitted by the transmitting antenna 142 to destination cellular stations. Each RF signal transmitted has a frequency equal to that selected for the corresponding active link at the central office 14, which is based on control signals provided from the controller 122 to the distributor 127 and the synthesizer 128. In addition, the power levels of the modulated RF signals transmitted at the transmitting antenna 142 correspond to the digital representations of the amplitudes of the analog signals, which also is based on the control signals provided by the controller 122 to the synthesizer 128.

The present invention, therefore, provides for consolidation and centralization of wide band digital signal processing operations at the office 14. The receiving and transmission equipment at the cell site 12 is effectively extended to the office 14 over optical fiber cables. Processing of data does not occur at the individual cell site 12 and the entire targeted RF spectrum is processed at the office 14. The controller 122 may supply control signals to the components within the office 14, namely, the channelizer 126, synthesizer 128, demodulators and modulators in the modem 124 and the distributors 125 and 127, to permit real time, dynamic assignment of RF carrier frequency, RF transmission power level and wireless protocol format for demodulation and modulation of communication signals. Thus, the controller 122 may instantaneously vary transmission and reception capacity of the system 10 in response to changes in wireless service demand.

The centralization of processing operations at the office 14 also may reduce the number of components and the size of a cell site in the system 10, and provide for economies in maintenance of equipment. Further, consolidation of typical cell site processing functions at the office 14, such as call handoff of a call between sectors of the same antenna system, the reception and acknowledgment of cellular stations having active channel links and entering the area served by a particular antenna and the scanning of the spectrum for calls and other signals not being processed by an antenna, minimizes the amount of overhead traffic between an office and a cell site, thereby providing increased capacity to a cellular system.

In addition, a cell site may have significantly increased capacity because the data used for modulating RF signals to be transmitted from the cell site is digitally generated at the office 14. For example, the analog representation of the IF spectrum would be devoid of harmonic signals which are commonly generated by conventional combinational methods, thereby permitting the assignment of more active channels which are within the limitations of the filters in a cellular station. Also, the generation of IF signals at the central office for all antennae in the system permits dynamic assignment of channels within the RF spectrum for meeting service demand where channel assignment is limited only by antenna-to-antenna interference.

Further, transmission of communication data over optical fibers using intensity modulation rather than digital modulation techniques provides for economic transport of communication signals over large distances. The cell site performs limited processing on the received RF signals, and the entire RF spectrum received is transported in its original form via an optical fiber cable to the central office. In addition, a small fraction of the spectral bandwidth on the optical fiber is occupied for transmission of the spectrum of signals detected at an antenna of a cell site. Also, less repeaters are required for interconnecting a lengthy optical fiber cable because the bit speeds which must be maintained in intensity modulation are not as great as those required for transmitting digitally modulated signals impressed onto optical fibers. The repeaters which may be used, such as, for example, IF repeaters which convert the optical signal to electrical IF form, perform amplification and then re-convert the electrical signals back to optical signals or, alternatively, optical amplifiers which amplify the optical signal in the optical domain, also are simpler and less costly than those used in digitally modulated optical systems.

Figure 2:
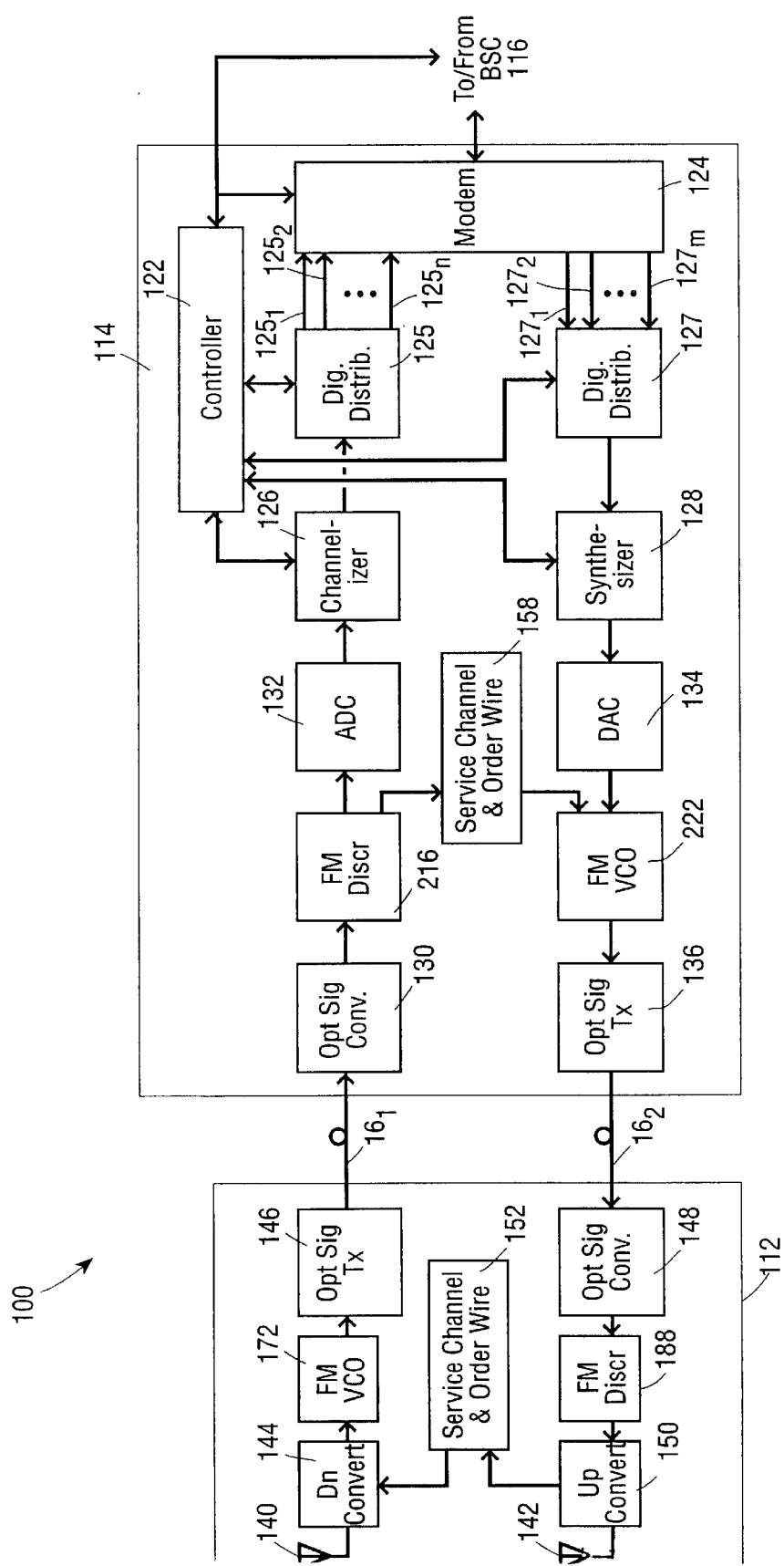
FIG. 2 is a schematic, simplified diagram of one preferred embodiment of the cellular communication system of the invention.

FIG. 2 illustrates one preferred embodiment of a system 100 operating in accordance with the present invention. The system 100 is similar in structure and operation to the system 10, except that lower frequency AM analog signals, corresponding to detected modulated RF signals or other communication signals supplied to a central office or data signals to be supplied to a cell site, are converted into frequency modulated (FM) signals by a frequency modulator before being supplied to an optical signal energy generator of an optical signal transmitter. The system 100 also includes means to convert FM signals back into AM signals. The conversion of AM signals to FM form for modulating the intensity of the optical energy output of an optical generator is described in detail in U.S. Pat. No. 4,786,186, incorporated by reference herein. The AM signals are preferably converted to FM form before being applied to modulate an optical signal to achieve noise improvement. Like reference numerals are used to designate components in the system 100 which are described in detail above with reference to the system 10.

Referring to FIG. 2, the system 100 includes a cell site 112 connected to a central office 114. The cell site 112 includes similar components and connections as the cell site 12, except a frequency modulator 172 connects the downconverter 144 to the optical signal transmitter 146 and a frequency modulation discriminator 188 connects the optical signal converter 148 to the upconverter 150. The cell site 112 further includes a service channel and order wire device, or servicer, 152 that is connected to the downconverter 144 and the upconverter 150.

The office 114 is modified in a similar manner for allowing conversion between FM and AM form, and vice versa. The office 114 includes similar components and connections as the office 14, and further includes a frequency modulation discriminator 216 connecting the optical signal converter 130 to the ADC 132 and a frequency modulator 222 connecting the DAC 134 to the optical signal transmitter 136. The office 114 further includes a servicer 158 that is connected to the discriminator 216 and the modulator 222.

The modulators 172 and 222 are well known frequency modulators, such as voltage controlled oscillators, that generate a highly linear, wide deviation FM representation of an AM analog signal. The discriminators 188 and 216 are well known frequency demodulators that demodulate FM signals into AM signals.

The servicer 152 is a well known cell site device that transmits cell site maintenance data to a central office such as the office 114, and receives responsive messages therefrom. Similarly, the servicer 158 is a well known central office device that transmits cell site maintenance data from a central office back to the cell site which transmitted service data signals to the central office. The servicers 152 and 158, in combination, perform well known system management operations, such as monitoring any warning lights placed on a cell site and monitoring changes in the received power level over an optical fiber cable, by exchanging data on a channel over the optical fiber cable which provides for direct communication between the central office and a cell site.

In a further preferred aspect of the invention, a system 300, may comprise multiple receiving and transmitting antennae situated at one or more cell sites 300A, which are similar to the cell site 112, and may operate to instantaneously vary active channel links among antennae and the cell sites 300A, which are coupled to an office 300B, in accordance with changing communication needs for the system 300 and the present inventive technique. In the system 300, the office 300B is similar to the office 114 and comprises multiple sets of discriminators, ADCs and channelizers and multiple sets of frequency modulators, DACs and synthesizers for the receiving and transmitting antennae, respectively, included in the system 300. A controller in the office 300B controls those components for selecting the receiving and transmitting antenna for an active channel link established with the system 300 to provide that the system 300 may operate as a virtual single cell site having multiple antennae. Like reference numerals are used to designate components in the system 300, illustrated in connection with FIGS. 3, 4 and 5 below, which are described in detail above with reference to the systems 10 and 100.

Figure 3:
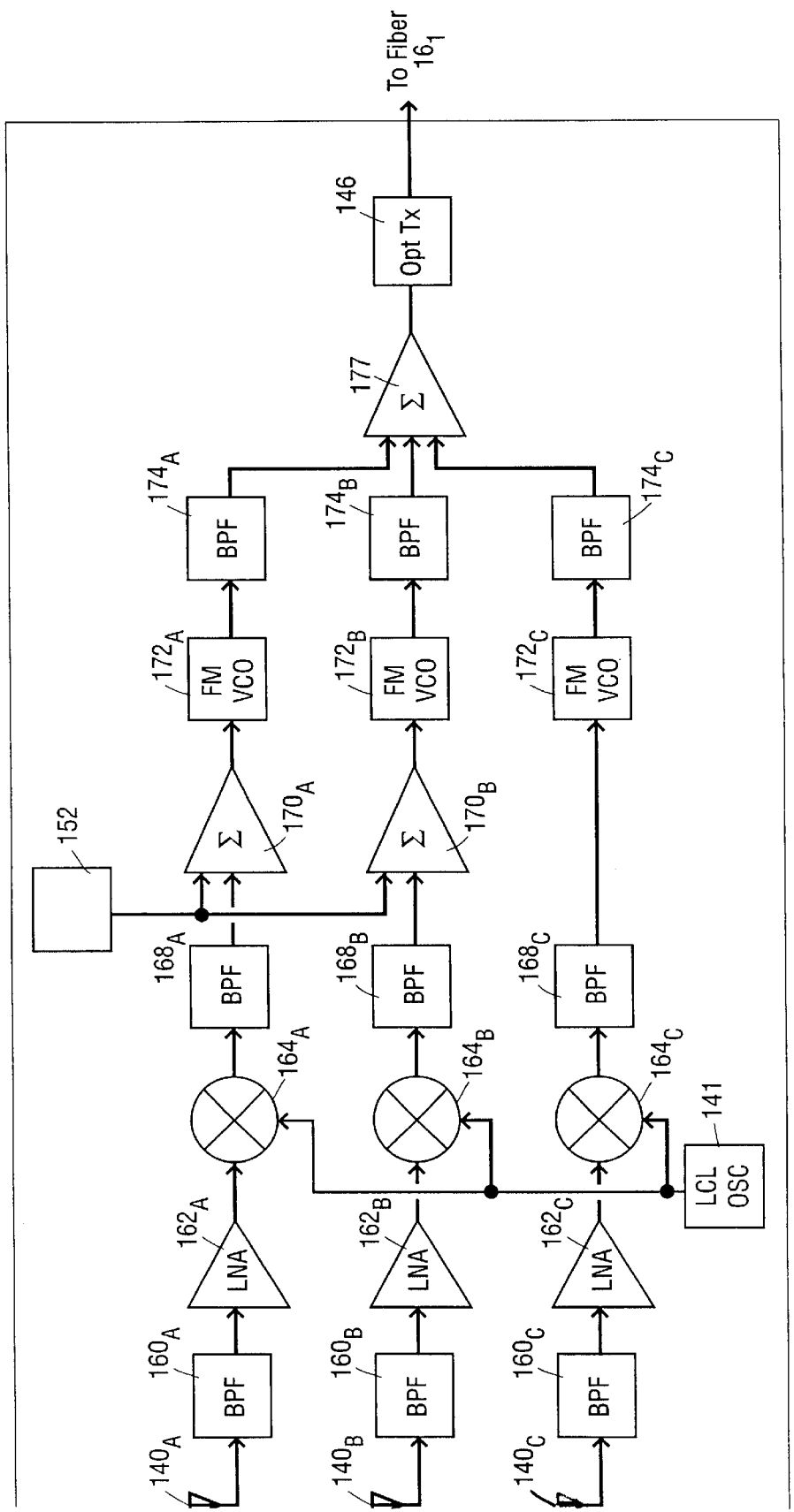
FIG. 3 is a schematic, simplified diagram of a preferred embodiment of the receiving apparatus at a cell site.

FIG. 3 illustrates a preferred receiving apparatus which may be implemented at the cell site 300A for detecting data modulated RF signals at each of a plurality of antennae. Referring to FIG. 3, the cell site 300A may suitably comprise bandpass filters (BPFs) $160_{A,B,C}$ that connect receiving antennae $140_{A,B,C}$ to inputs of low noise amplifiers (LNAs) $162_{A,B,C}$, respectively. The receiving antennae $140_{A,B,C}$ preferably are directional antennae which each cover a distinct sector of the cell. First input of mixers $164_{A,B,C}$ are connected to outputs of the LNAs $162_{A,B,C}$, respectively, and second inputs of the mixers $164_{A,B,C}$ are each connected to a local oscillator (LO) 141. Outputs of the mixers $164_A$ and $164_B$ are connected through BPFs $168_A$ and $168_B$ to first inputs of combiners $170_A$ and $170_B$, respectively. A servicer 152 is connected to second inputs of the combiners $170_A$ and $170_B$. The mixer $164_C$ includes an output that is connected to a BPF $168_C$. Frequency modulators $172_{A,B}$ are connected to outputs of the combiners $170_A$ and $170_B$, respectively, and a frequency modulator $172_C$ is connected to the BPF $168_C$. BPFs $174_{A,B,C}$ connect outputs of the frequency modulators $172_{A,B,C}$, respectively, to a combiner 177. The combiner 177 is connected to an optical signal transmitter 146.

Figure 4:
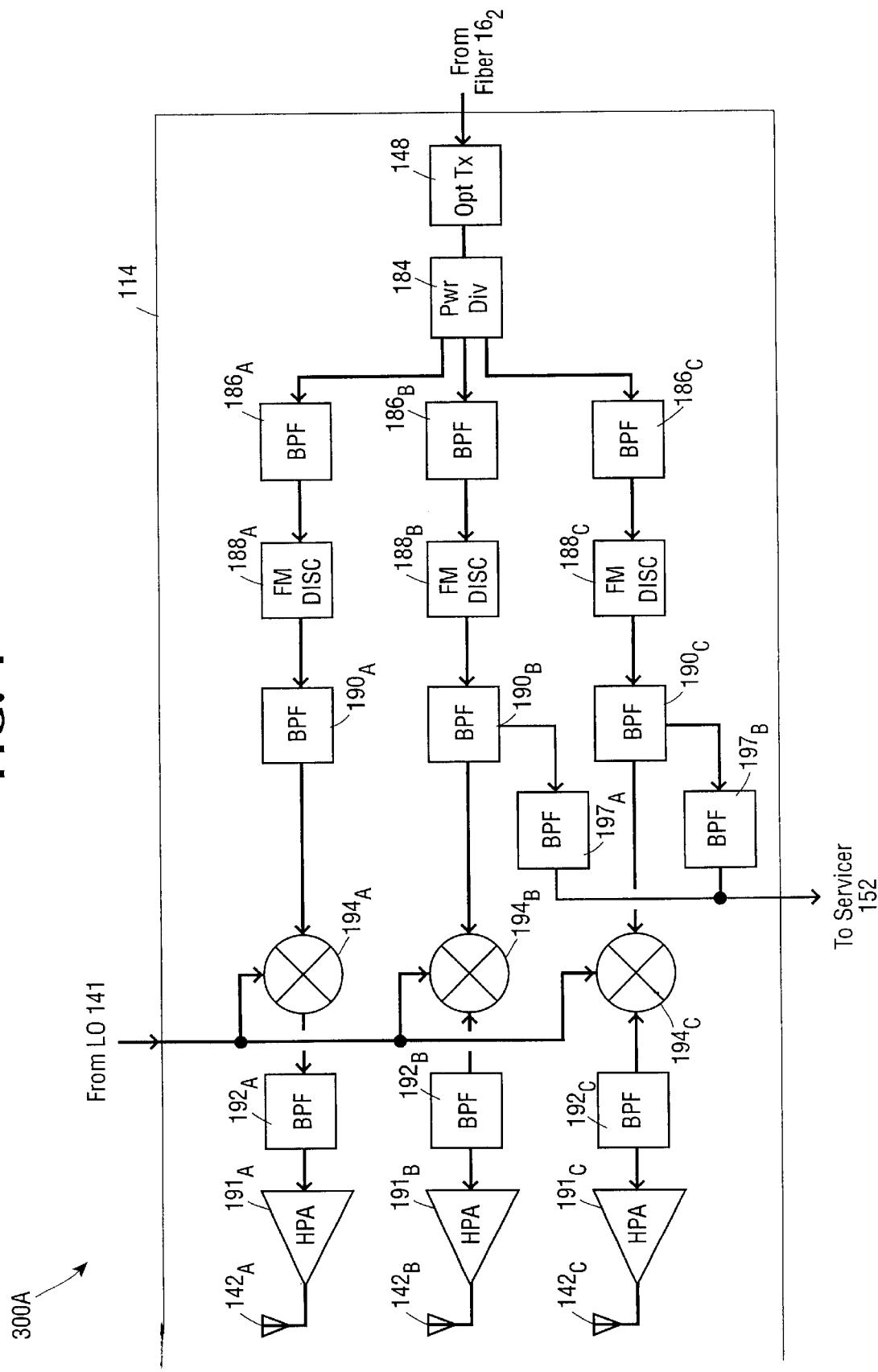

FIG. 4 illustrates one preferred embodiment of a transmitting apparatus which may be implemented at the cell site 300A for transmitting data modulated RF signals at any of a plurality of antennae. Referring to FIG. 4, the transmitting apparatus may suitably comprise an optical signal converter 148 connected to a three-output power divider 184. Bandpass filters $186_{A,B,C}$ connect the outputs of the divider 184 to FM discriminator $188_{A,B,C}$, respectively. BPFs $190_{A,B,C}$ connect outputs of the FM discriminators $188_{A,B,C}$ to first inputs of mixers $194_{A,B,C}$, respectively. The mixers $194_{A,B,C}$ include second inputs, each of which is connected to the LO 141, and outputs that are connected through BPFs $192_{A,B,C}$ to high power amplifiers (HPAs) $191_{A,B,C}$, respectively. BPFs $197_A$ and $197_B$ connect the outputs of the BPFs $190_B$ and $190_C$, respectively, to the servicer 152. The HPAs $191_{A,B,C}$ are connected to transmitting antennae $142_{A,B,C}$, respectively.

The LO 141 is a well known device that generates a stable, fixed frequency output signal. The mixers $164_{A,B,C}$ and $194_{A,B,C}$ are well known devices which use a reference signal, such as that provided by the LO 141, for heterodyning signals between one frequency range and another, such as between RF and IF or IF and RF. The LNAs 162 are conventional devices that suitably increase the power of RF carrier signals.

In one embodiment, each of the HPAs $191_{A,B,C}$ may suitably comprise an array of solid state 10 Watt wideband, highly linear noise free GaAs power amplifiers. Each of these GaAs amplifier arrays may amplify any portion of the RF spectrum and is suitably imbedded into the face of a respective transmitting antenna 142, which preferably has a concave face, to provide for constructive interference and radiation from a focal point which is a predetermined distance from the cell site 112. This arrangement provides the advantage that a sector at the cell site 112 merely loses transmission strength and does not become non-functional if problems arise with one or more of the GaAs amplifiers in one of the HPAs 191 for a respective antenna 142. Further, the use of HPAs at a cell site provides that RF signals are combined in free space for minimizing harmonic signal generation upon the transmission of RF signals, which would otherwise limit utilization of the RF spectrum, and maintaining signal linearity.

Figure 5:
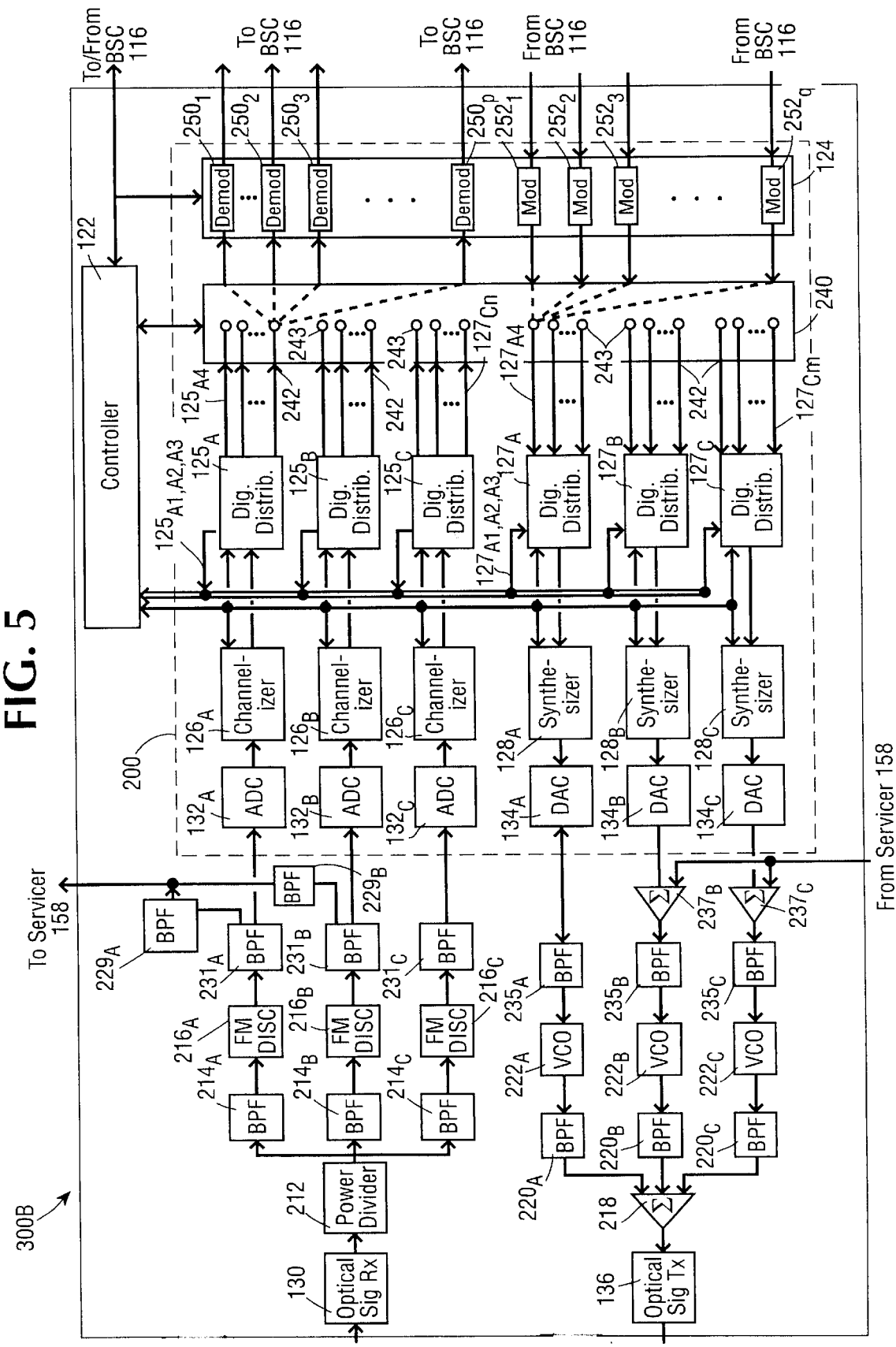
FIG. 5 is a schematic, simplified diagram of a preferred embodiment of the apparatus at a central office or MTSO.

FIG. 5 shows a preferred embodiment of the office 300B for processing data signals exchanged with the cell site 300A over the fibers $16_{1,2}$ in the form of intensity modulated optical signals. Referring to FIG. 5, the office 300B comprises an optical signal converter 130 which is connected to a power divider 212, BPFs $214_{A,B,C}$, FM discriminators $216_{A,B,C}$, BPFs $231_{A,B,C}$ and BPFs $229_{A,B}$ in the same manner that the optical signal converter 148 is connected to the power divider 184, the BPFs $186_{A,B,C}$, the FM discriminators $188_{A,B,C}$, the BPFs $190_{A,B,C}$ and the BPFs $197_{A,B}$, respectively, in the cell site 300A shown in FIG. 4.

The office 300B further comprises a digital signal processing subsystem 200 which includes ADCs $132_{A,B,C}$ connected to channelizers $126_{A,B,C}$, respectively, and synthesizers $128_{A,B,C}$ connected to DACs $134_{A,B,C}$, respectively. The ADCs $130_{A,B,C}$ are connected to BPFs $231_{A,B,C}$, respectively. Inputs of digital distributors $125_{A,B,C}$ are connected to the channelizers $126_{A,B,C}$, respectively. Output channels $125_{A1,A2,A3}$, $125_{B1,B2,B3}$ and $125_{C1,C2,C3}$ of the distributors $125_{A,B,C}$, respectively, are connected directly to the controller 122. Output channels $125_{A4,A5 \ldots An}$, $125_{B4,B5 \ldots Bn}$ and $125_{C4,C5 \ldots Cn}$ of the distributors $125_{A,B,C}$, respectively, are connected to routing ports 242 of a digital switch 240. The switch 240 includes electronic gates 243 for establishing a connection path between a routing port and one of a plurality of demodulators $250_{1,2 \ldots p}$ or modulators $252_{1,2 \ldots q}$ in the modem 124.

Inputs channels $127_{A1,A2 \ldots An}$, $127_{B1,B2 \ldots Bn}$ and $127_{C1,C2 \ldots Cn}$ of the distributors $127_{A,B,C}$, respectively, are also connected to the routing ports 242 of the switch 240. Inputs channels $127_{A1,A2,A3}$, $127_{B1,B2,B3}$ and $127_{C1,C2,C3}$ of the distributors $127_{A,B,C}$, respectively, are connected to the controller 122. The distributors $127_{A,B,C}$ further include outputs that are connected to the synthesizers $128_{A,B,C}$, respectively. Combiners $237_{B,C}$ connect the DACs $134_{B,C}$ to BPFs $235_{B,C}$, respectively, and a BPF $235_A$ is connected to the DAC $134_A$. The servicer 158 is also connected to each of the combiners $237_{B,C}$. Optical signal transmitter 136 is connected to a combiner 218, BPFs $220_{A,B,C}$, modulators $222_{A,B,C}$ and the BPFs $235_{A,B,C}$ in the same manner that the optical signal transmitter 146 is connected to the combiner 177, the BPFs $174_{A,B,C}$ and the modulators $172_{A,B,C}$, respectively, in the cell site 300A as shown in FIG. 3.

The BPFs $160_{A,B,C}$ and $192_{A,B,C}$ are filters which are well known in the art and have passbands which are suitable to the RF operating range serviced by the system 300. The passband may, for example, be at approximately 800, 900 or 1900 Mhz to correspond with the European, U.S. or personal communication system (PCS) network operating requirements for a cellular system. For purposes of illustration, the system 300 is operating according to U.S. requirements. It is to be understood that the wireless protocols may include, for example, AMPS, CDMA, TDMA, GSM or any subsequently developed protocol that suitably subdivides the radiation spectrum. The BPFs $168_{A,B,C}$ and $190_{A,B,C}$ are well known filters having 15 MHz wide passbands in the corresponding lower frequency or IF operating range of the system 300. The BPFs $197_{A,B}$ and $229_{A,B}$ are well known bandpass filters having passbands suitable for providing data signals to the servicers 152 and 158, respectively. The combiners $170_A$, $170_B$, $237_A$ and $237_B$ are well known summing amplifiers.

The modulators in the two sets of the frequency modulators $172_{A,B,C}$ and $222_{A,B,C}$ have center frequencies, respectively, that are offset from each other by approximately 135 MHz. These offsets exploit the bandwidth capability of the fiber 16, which is typically 500 MHz, and prevent intermodulation among FM representations of low frequency analog signals when they are combined at a combiner. The demodulation frequencies used at the discriminators $216_{A,B,C}$ and $188_{A,B,C}$ correspond to the center frequencies of the frequency modulators $172_{A,B,C}$ and $222_{A,B,C}$, respectively. The center and demodulation frequencies at the office 300B and the cell site 300A are matched for establishing a signal path extending between a selected antenna at the cell site 300A and the digital system 200.

The BPFs $174_{A,B,C}$ and $214_{A,B,C}$ and the BPFs $186_{A,B,C}$ and $220_{A,B,C}$ are well known filters having passbands centered about the center and demodulation frequencies of the modulators and the discriminators $172_{A,B,C}$ and $216_{A,B,C}$ and $188_{A,B,C}$ and $222_{A,B,C}$, respectively, with bandwidths suitably equal to the sum of twice the maximum deviation of the center frequency of a modulator and twice the highest frequency of the analog signal supplied to the modulator.

The switch 240 is a well known digitally controllable device including electronic gates 243 which may be opened or controlled, based on control signals, for establishing selected signal paths to and from the individual routing ports 242 and locations connected to the electronic gates 243.

The power dividers 184 and 212 are well known devices which equally subdivide a received signal into a plurality of identical output signals having lesser power levels.

The cell site 300A and the office 300B exchange data signals over the fibers $16_{1,2}$ and the data signals are digitally processed at the office 300B for establishing or maintaining active channel links, exchanging overhead control signal data with cellular stations in the service range of the cell site 300A and attending to servicing at the cell site 300A in the following manner. The entire spectrum of data modulated RF signals are detected at each of the receiving antennae $140_{A,B,C}$ and routed therefrom through the BPFs $160_{A,B,C}$, respectively, for eliminating signals outside the operational RF spectrum of the system 300. The LNAs $162_{A,B,C}$ amplify the filtered RF signals to a suitable level to permit the mixers $164_{A,B,C}$, which use a predetermined signal supplied by the LO 141, to convert them to lower frequency AM signals, respectively. The BPFs $168_{A,B,C}$ filter the respective lower frequency signals. The combiners $170_A$ and $170_B$ sum any service data signals, which are preferably in the IF range, supplied from the servicer 152 with the AM signals supplied from the mixers $164_A$ and $164_B$, respectively. For ease of reference, communication signals associated with data modulated RF signals detected at a particular receive antenna 140 and any service data signals combined with the communication signals detected at a particular receive antenna are referred to collectively as a receive antenna bundle. For simplicity, service data signals are not discussed below; it is to be understood, however, that these service data signals would be processed in a similar manner as the communication signals being exchanged.

The AM signals forming the three receive antenna bundles signals are supplied to the modulators $172_{A,B,C}$, respectively, each of which generates a distinct, highly linear, wide deviation FM representation of the respective receive antenna bundle signals. The BPFs $174_{A,B,C}$ eliminate from the respective FM representations any signals outside the desired bands corresponding to the center frequencies of the modulators $172_{A,B,C}$, respectively. The center frequencies of the modulators $172_{A,B,C}$ may, for example, be set equal to 70, 230 and 350 MHz, respectively, to prevent intermodulation when the respective FM representations are combined at the combiner 177. The combined FM signals from the combiner 177 are supplied to the optical transmitter 146, which generates an intensity modulated optical receive data signal for routing over the fiber $16_1$ to the office 300B.

At the office 300B, the optical receive signal is converted to electrical signal form by the optical signal converter 130 and routed, via the power divider 212, identically through the BPFs $214_{A,B,C}$ and to the FM discriminators $216_{A,B,C}$. The FM discriminators $216_{A,B,C}$ demodulate the FM signals into AM signals corresponding to the AM signals at the cell site 300A associated with the signal paths for the antennae $140_{A,B,C}$, respectively. The BPFs $231_{A,B,C}$ filter the outputs of the discriminators $216_{A,B,C}$, respectively, for eliminating spurious or intermodulation signals. The BPFs $229_{A,B}$ separate analog signals supplied from the FM discriminators $216_{A,B}$ that represent the service data signals provided by the servicer 152. These service data signals are routed to the servicer 158 for conventional processing. Similar to the system 10, the ADCs $130_{A,B,C}$ generate digital representations of the AM signals in the respective receive antenna bundle signals and supply those bit streams to the channelizers $126_{A,B,C}$, respectively. The channelizers $126_{A,B,C}$ segment the digital representations of the AM signals for the receive antenna bundles, respectively, according to their position in the spectrum. The controller 122, for example, may provide control signals to the channelizer $126_A$ to provide for filtering of the digital representations of the AM signals of the respective receive antenna bundle signal into spectral bands that have a 200 KHz bandwidth for GSM or TDMA, a 30 KHz bandwidth in AMPS applications or any combination of bandwidths in mixed or future applications.

The controller 122 also provides control signals to the distributors $125_{A,B,C}$ and the switch 240 for establishing the signal paths for routing spectral segments of the data bit packets supplied by the channelizers $126_{A,B,C}$ between ones of the communication output channels of the respective distributors $125_{A,B,C}$ and ones of the demodulators $250_{1,2\ldots p}$. For example, a spectral segment corresponding to a communication signal detected at the receive antenna $140_A$, which is in the AMPS protocol format, may be selected for routing from the channelizer $126_A$, through the distributor channel $125_{A4}$ and to the demodulator $250_1$. The demodulator $250_1$ would be programmed for processing modulated data bits according to the AMPS wireless protocol format.

The demodulators $250_{1,2\ldots p}$ in the modem 124 route the processed communication channel data streams to the BSC 116 for further processing and routing according to conventional techniques. The BSC 116 may supply the baseband data signals for an active channel link in the system 300 to the switch 120 for routing to a publicly switched network destination.

In addition, the controller 122 supplies control signals to the distributor $125_{A,B,C}$ for routing digital representations of the spectrally segmented channel data bit streams over the output channels $125_{A1,A2,A3}$, $125_{B1,B2,B3}$ and $125_{C1,C2,C3}$, respectively, directly to the controller 122. These data streams may include overhead communication signals from cellular stations within the geographically serviceable area of the cell site 300A and telephone communication signals associated with active channel links established with the cell site 300A. The controller 122 processes the data signals associated with the active channel links for determining the actual received RF power level at the antennae $142_{A,B,C}$ for the RF signals expected to be received at each of the respective antennae of the cell site 300A. The actual RF power levels are proportional to the digital representation of the amplitudes of the AM signals supplied from the channelizers $126_{A,B,C}$ to the distributors $125_{A,B,C}$, respectively.

It is noted that RF communication data signals associated with other active channel links established with the system 100, or a neighboring wireless system, may be included in one or more the spectral bands of the data bit streams generated at the channelizer $126_{A,B,C}$. The controller 122, however, only provides control signals to the distributors $125_{A,B,C}$ and the switch 240 for establishing a connection path to the demodulators $250_{1,2 \ldots p}$ which routes data bit streams corresponding to communication signals for active channel links, where the bit streams are representative of frequencies corresponding to those RF carriers expected for the active channel links established at the cell site 300A.

In addition, the controller 122 may perform digital signal processing on all segmented bit streams supplied to the distributors $125_{A,B,C}$ for monitoring the status of any RF signals detected at any of the receiving antennae in the system 300. Because the controller 122 may continuously monitor the status update of wireless transmission in the system 300, the controller 122 may re-establish or initially establish an active channel link virtually instantaneously at any antenna in the system 300 when the need arises, such as, for example, when an antenna or entire cell site entirely fails.

Further, the controller 122 controls the routing of overhead data signals and communication data signals associated with the active channel links from the office 300B to the cell site 300A as follows. The controller 122 monitors the transfer of baseband communication data streams to the BSC 116 from the switch 120, and provides control signals to the BSC 116, the modem 124 and the switch 240 for establishing connection paths from the BSC 116, through the modulators $252_{1,2 \ldots q}$ and to data channel inputs at the distributors $127_{A,B,C}$ according to the wireless protocol format and transmission antenna at the cell site 300A selected for transmitting the communication channel data as modulated RF signals. For example, the controller 122 may establish a connection path from one or more of the modulators 252 to the distributor $127_A$ for routing channel data signals for transmission from the antenna $142_A$. Further, the controller 122 supplies overhead data signals over the channel inputs to the distributors $127_{A,B,C}$. For purposes of simplicity, these overhead signals are not considered below. It is noted that they would be processed in a manner similar to the communication channel bit streams.

The controller 122 provides control signals to the distributors $127_{A,B,C}$ for spectrally positioning communication signal bit streams to provide for generation of digital representations of AM signals having desired frequencies at the synthesizers $128_{A,B,C}$, respectively. Depending on the received power level for the RF signals detected for the active channel links established at the cell site 300A, the controller 122 provides control signals to the synthesizers $128_{A,B,C}$ for generating digital representations of AM signals having amplitudes that correspond to the desired RF power level for transmission in upconverted form as data modulated RF signals at the antennae $142_{A,B,C}$. For example, the controller 122 may suitably provide control signals to the synthesizer $128_A$ for adjusting higher or lower the power level for an RF signal transmission associated with an active channel link as the cellular station associated with the link moves further away from or closer to the transmitting antenna assigned for the link during the course of a wireless data exchange. Further, the controller 122 provides control signals to the synthesizers $128_{A,B,C}$ for generating digital representation of AM signals having frequencies according to the spectral positions of the channel data streams so that the frequencies correspond to the desired RF carrier frequencies for the active channel links after upconversion is performed at the cell site 300A.

The DACs $134_{A,B,C}$ convert the digital representations of AM signals generated by the synthesizer $128_{A,B,C}$ into analog AM signals, which are then filtered at the BPF $235_{A,B,C}$, respectively. For simplicity, it is assumed that the servicer 158 does not provide service signals. These AM signals or transmit antenna bundles are converted to FM form and then used for generating an intensity modulated optical transmit signal at the optical signal transmitter 136, in the same manner as described above. The optical transmit signal is routed to the cell site 300A over the fiber $16_2$.

At the cell site 300A, the optical converter 148 converts the optical transmit signal into an electrical signal, which is in the form of FM signals. The FM representations are routed through the power divider 184 and the BPFs $186_{A,B,C}$ for subdivision into three distinct, filtered FM representations, which are selectively demodulated at the FM discriminators $188_{A,B,C}$, respectively, into AM signals corresponding to the individual AM transmit bundle signals generated at the office 300B. These transmit bundle AM signals are filtered at the BPFs $190_{A,B,C}$ and then converted to corresponding data modulated RF signals at the mixers $194_{A,B,C}$, respectively. These RF signals are further filtered at the BPFs $192_{A,B,C}$ before routing to the HPAs $191_{A,B,C}$, which provide for RF transmission at the antennae $142_{A,B,C}$, respectively.

It is to be understood that the embodiments and variations shown and described above are illustrative of the principles of this invention only and that various modifications may be implemented by those skilled in the art without departing from the scope and spirit of the invention.

I claim:

1. A cellular communication system comprising:
    radio frequency receiving apparatus at a cell site, said apparatus comprising:
        a radio frequency energy receiver for receiving radio frequency (RF) energy at frequencies within a predetermined range of radio frequencies and modulated by data signals, wherein the RF energy has a predetermined spectral occupancy;
        downconverting means coupled to said radio frequency receiver for converting the data signal modulated RF energy received by said radio frequency receiver to energy modulated by said data signals having a frequency lower than said predetermined range of frequencies of energy received by said radio frequency receiver, wherein the lower frequency energy has a spectral occupancy which is the same as the predetermined spectral occupancy; and
        an optical signal transmitter coupled to said downconverting means, wherein said optical signal transmitter transmits optical signals modulated by said energy modulated by said data signals having a frequency lower than said predetermined range of frequencies of energy received by said radio frequency receiver;
    a telephone switching office comprising:
        an optical signal receiver for converting the optical signals into electrical signals; and
        switching and control means coupled to said optical signal receiver for providing output signals corresponding to said electrical signals; and
    at least one optical fiber interconnecting said optical signal transmitter with said optical signal receiver.

2. A cellular communication system comprising:
    a telephone switching office comprising:
        switching and control means for providing data signals; and
        an optical signal transmitter coupled to said switching and control means for transmitting optical signals analogically modulated by said data signals;
    radio frequency transmitting apparatus at a cell site, said apparatus comprising:
        an optical signal receiver for converting optical signals into electrical signals, wherein said electrical signals have a predetermined spectral occupancy;

upconverting means coupled to said optical signal receiver for converting said electrical signals into radio frequency energy at frequencies in a predetermined range of frequencies, wherein the radio frequency energy has a spectral occupancy which is the same as the predetermined spectral occupancy; and a radio frequency energy transmitter coupled to said upconverting means for transmitting the radio frequency energy into which said upconverter converts said electrical signals, wherein said transmitted radio frequency energy is at the frequencies within the predetermined range of radio frequencies at which said transmitter transmits modulated radio frequency energy; and at least one optical fiber interconnecting said optical signal transmitter with said optical signal receiver.

3. A cellular communication system comprising:

radio frequency (RF) receiving and transmitting apparatus at a cell site, said apparatus comprising:

a radio frequency energy receiver for receiving radio frequency energy at frequencies within a predetermined range of radio frequencies and modulated by first data signals, wherein the received RF energy has a first spectral occupancy; and a radio frequency energy transmitter for transmitting radio frequency energy at frequencies within a predetermined range of frequencies and modulated by second data signals, wherein the transmitted RF energy has a second spectral occupancy;

said cell site comprising:

downconverting means coupled to said receiver for converting the modulated radio frequency energy received by said receiver to intermediate frequency energy modulated by said first data signals and having a frequency lower than said predetermined range of frequencies of energy received by said receiver, wherein the intermediate frequency energy has the first spectral occupancy;

a first optical signal transmitter coupled to said downconverting means for transmitting optical signals modulated by said intermediate frequency energy;

a first optical signal receiver for converting optical signals into first electrical signals, wherein said electrical signals have the second spectral occupancy; and upconverting means coupled to said first optical signal receiver for converting said first electrical signals into radio frequency energy at frequencies in said predetermined range of frequencies at which said transmitter transmits modulated radio frequency energy, said radio frequency energy transmitter being coupled to said upconverting means for transmitting the radio frequency energy into which said upconverter converts said first electrical signals;

a telephone switching office comprising:

a second optical signal receiver for converting optical signals into second electrical signals;

switching and control means coupled to said second optical signal receiver for providing output signals corresponding to said second electrical signals, said switching and control means also being connectable to a source of data signals for providing the second data signals; and a second optical signal transmitter coupled to said switching and control means for transmitting analogically modulated optical signals corresponding to said second data signals; and at least one optical fiber interconnecting said first optical signal transmitter with said second optical signal receiver and interconnecting said second optical signal transmitter with said first optical signal receiver.

4. The cellular communication system of claim 1, wherein said cell site further comprises frequency modulating means coupled to said downconverting means for converting said downconverted energy modulated by said data signals to frequency modulated signals;

wherein said optical signal transmitter is coupled to said frequency modulating means for transmitting optical signals modulated by said frequency modulated signals; and wherein said office further comprises frequency discriminating means coupled to said optical signal receiver for frequency demodulating said electrical signals.

5. The communication system of claim 3, wherein said cell site further comprises frequency modulating means coupled to said downconverting means for converting said downconverted energy modulated by said first data signals to first frequency modulated signals;

wherein said first optical signal transmitter is coupled to said frequency modulating means for transmitting optical signals modulated by said first frequency modulated signals; and wherein said office further comprises frequency discriminating means coupled to said second optical signal receiver for frequency demodulating said second electrical signals.

6. The communication system of claim 3, wherein said switching and control means further comprises means for processing said second electrical signals for determining RF power levels of said RF energy modulated by the first data signals.

7. The communication system of claim 3, wherein said switching and control means further comprises means for processing said output signals corresponding to said second electrical signals according to at least one selected wireless protocol.

8. The communication system of claim 3, wherein said RF energy receiver further comprises a plurality of receiving means for receiving said RF energy modulated by said first data signals, and wherein said switching and control means further comprises a modem and means for selecting the receiving means from which the corresponding output signals are processed at the modem.

9. The communication system of claim 3, wherein said RF energy transmitter further comprises a plurality of transmitting means for transmitting RF energy modulated by second data signals, and wherein said switching and control means further comprises means for selecting the transmitting means from which upconverted second electrical signals corresponding to said second data signals are transmitted.

10. The communication system of claim 3, wherein said switching and control means further comprises means for controlling power levels at which the RF energy transmitter transmits said RF energy into which said upconverter converts said first electrical signals.

11. The communication system of claim 3, wherein said switching and control means further comprises means for controlling a frequency at which the RF energy transmitter transmits said RF energy into which said upconverter converts said first electrical signals.

\* \* \* \* \*